(12) United States Patent
Naguib et al.

(10) Patent No.: US 9,118,111 B2
(45) Date of Patent: Aug. 25, 2015

(54) ANTENNA ARRAY CALIBRATION FOR WIRELESS COMMUNICATION SYSTEMS

(75) Inventors: Ayman Fawzy Naguib, Cupertino, CA (US); Alexei Gorokhov, San Diego, CA (US); Rajiv Vijayan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1150 days.

(21) Appl. No.: 11/405,832

(22) Filed: Apr. 17, 2006

(65) Prior Publication Data

US 2007/0099670 A1 May 3, 2007

Related U.S. Application Data

(60) Provisional application No. 60/733,022, filed on Nov. 2, 2005.

(51) Int. Cl.
*H04B 17/00* (2006.01)
*H01Q 3/26* (2006.01)
*H04B 17/12* (2015.01)
*H04B 17/21* (2015.01)
*H04B 17/24* (2015.01)

(52) U.S. Cl.
CPC ............ *H01Q 3/267* (2013.01); *H04B 17/12* (2015.01); *H04B 17/21* (2015.01); *H04B 17/24* (2015.01)

(58) Field of Classification Search
USPC ........ 455/561, 562.1, 423, 424, 67.11, 67.16, 455/103, 104, 115.1
See application file for complete search history.

(56) References Cited

U.S. PATENT DOCUMENTS

| | | | |
|---|---|---|---|
| 5,008,900 | A | 4/1991 | Critchlow et al. |
| 6,037,898 | A | 3/2000 | Parish et al. |
| 6,188,896 | B1 | 2/2001 | Perahia et al. |
| 6,448,939 | B2 | 9/2002 | Maruta |
| 6,462,704 | B2 | 10/2002 | Rexberg et al. |
| 6,496,140 | B1 | 12/2002 | Alastalo |
| 6,600,445 | B2 | 7/2003 | Li |
| 6,615,024 | B1 | 9/2003 | Boros et al. |
| 6,661,284 | B1 | 12/2003 | Luz et al. |
| 6,690,952 | B2 | 2/2004 | Nishimori et al. |
| 6,701,264 | B2 | 3/2004 | Caso et al. |
| 6,778,147 | B2 | 8/2004 | Sanada et al. |
| 6,801,867 | B2 | 10/2004 | Bortnyk |
| 6,876,870 | B2 * | 4/2005 | Hiramatsu et al. ......... 455/562.1 |

(Continued)

FOREIGN PATENT DOCUMENTS

| | | |
|---|---|---|
| CN | 1507168 A | 6/2004 |
| EP | 0642191 A | 3/1995 |

(Continued)

OTHER PUBLICATIONS

International Search Report—PCT/US2006/060495, International Search Authority—European Patent Office—Jun. 21, 2007.

(Continued)

*Primary Examiner* — Wen Huang
(74) *Attorney, Agent, or Firm* — Howard Seo

(57) ABSTRACT

Calibration for a transmit chain of a device transmitting information to multiple devices over wireless links includes selecting from between two or more calibration determination techniques. In certain aspects the techniques include phase only calibration and phase and amplitude calibration.

20 Claims, 10 Drawing Sheets

(56) References Cited

U.S. PATENT DOCUMENTS

| | | |
|---|---|---|
| 6,888,809 B1 | 5/2005 | Foschini et al. |
| 6,904,290 B1 | 6/2005 | Palenius |
| 6,947,768 B2 | 9/2005 | Adachi et al. |
| 7,031,669 B2 | 4/2006 | Vaidyanathann et al. |
| 7,035,592 B1 | 4/2006 | Doi et al. |
| 7,079,514 B2 | 7/2006 | Kim et al. |
| 7,133,698 B2 * | 11/2006 | Miyoshi et al. ............ 455/562.1 |
| 7,184,734 B2 | 2/2007 | Yuda et al. |
| 7,205,936 B2 | 4/2007 | Park et al. |
| 7,277,679 B1 * | 10/2007 | Barratt et al. ................. 455/101 |
| 7,280,072 B2 | 10/2007 | Mallick |
| 7,304,605 B2 | 12/2007 | Wells |
| 7,313,174 B2 | 12/2007 | Alard et al. |
| 7,392,016 B2 | 6/2008 | Tsien et al. |
| 2001/0005685 A1 | 6/2001 | Nishimori et al. |
| 2001/0011961 A1 | 8/2001 | Rexberg et al. |
| 2001/0020919 A1 | 9/2001 | Maruta et al. |
| 2002/0103013 A1 * | 8/2002 | Watson et al. ................. 455/562 |
| 2003/0040880 A1 | 2/2003 | Bortnyk et al. |
| 2003/0058166 A1 | 3/2003 | Hirabe |
| 2003/0064752 A1 | 4/2003 | Adachi et al. |
| 2003/0064762 A1 | 4/2003 | Tanabe et al. |
| 2003/0227408 A1 | 12/2003 | Sanada et al. |
| 2004/0048580 A1 * | 3/2004 | Lunn et al. ...................... 455/73 |
| 2004/0048584 A1 | 3/2004 | Vaidyanathan |
| 2004/0105386 A1 | 6/2004 | Sipola |
| 2004/0110538 A1 * | 6/2004 | Doi ............................ 455/562.1 |
| 2004/0142729 A1 | 7/2004 | Yuda et al. |
| 2004/0166808 A1 | 8/2004 | Hasegawa et al. |
| 2004/0217920 A1 | 11/2004 | Ishikawa |
| 2004/0266483 A1 | 12/2004 | Choi |
| 2005/0070333 A1 | 3/2005 | Doi |
| 2005/0095996 A1 | 5/2005 | Takano |
| 2005/0130663 A1 | 6/2005 | Hong et al. |
| 2005/0141630 A1 * | 6/2005 | Catreux et al. ................ 375/267 |
| 2005/0162305 A1 | 7/2005 | Wells et al. |
| 2005/0164664 A1 | 7/2005 | DiFonzo et al. |
| 2006/0019712 A1 * | 1/2006 | Choi ........................... 455/562.1 |
| 2006/0232470 A1 | 10/2006 | Mallickk et al. |
| 2006/0240784 A1 | 10/2006 | Naguib et al. |
| 2006/0284725 A1 | 12/2006 | Naguib et al. |
| 2006/0286974 A1 | 12/2006 | Gore et al. |
| 2006/0293087 A1 * | 12/2006 | Tsutsui ...................... 455/562.1 |
| 2007/0099570 A1 * | 5/2007 | Gao et al. ..................... 455/63.1 |
| 2007/0099573 A1 | 5/2007 | Naguib et al. |
| 2007/0224942 A1 * | 9/2007 | Kuramoto et al. ......... 455/67.11 |
| 2007/0225042 A1 * | 9/2007 | Kitahara .................... 455/562.1 |
| 2008/0004078 A1 | 1/2008 | Barratt et al. |

FOREIGN PATENT DOCUMENTS

| | | |
|---|---|---|
| EP | 0654915 | 5/1995 |
| EP | 1104122 | 5/2001 |
| EP | 1133836 A1 | 9/2001 |
| GB | 2346013 | 7/2000 |
| JP | 01213038 | 8/1989 |
| JP | H1127031 A | 1/1999 |
| JP | 2000216618 | 4/2000 |
| JP | 2001177458 A | 6/2001 |
| JP | 2002141730 A | 5/2002 |
| JP | 2002530998 | 9/2002 |
| JP | 3332911 | 10/2002 |
| JP | 2003092508 | 3/2003 |
| JP | 2003264492 | 9/2003 |
| JP | 2003309513 | 10/2003 |
| JP | 2004304586 | 10/2004 |
| JP | 2004343468 | 12/2004 |
| JP | 2006512807 | 4/2006 |
| KR | 20010076252 | 8/2001 |
| KR | 20010110464 | 12/2001 |
| KR | 1020020022109 | 3/2002 |
| KR | 20020026605 | 4/2002 |
| KR | 200289094 | 11/2002 |
| KR | 100584625 | 5/2006 |
| WO | 9914870 | 3/1999 |
| WO | 9957820 | 11/1999 |
| WO | WO0031892 A1 | 6/2000 |
| WO | 0119101 | 3/2001 |
| WO | 02/11237 A | 2/2002 |
| WO | 02078209 | 10/2002 |
| WO | 2004039022 | 5/2004 |
| WO | WO2004038952 | 5/2004 |
| WO | WO2004039011 | 5/2004 |
| WO | WO2005081483 | 9/2005 |
| WO | 2006116453 | 11/2006 |

OTHER PUBLICATIONS

Written Opinion—PCT/US2006/060495, International Search Authority—European Patent Office—Jun. 21, 2007.

International Preliminary Report on Patentability—PCT/US2006/060495, International Bureau of WIPO—Geneva, Switzerland—May 6, 2008.

Taiwanese Search Report—No. 095140637—TIPO, Feb. 3, 2010.

"Taiwanese Search Report—No. 095140637—TIPO, Nov. 15, 2010".

* cited by examiner

ANTENNA ARRAY CALIBRATION FOR WIRELESS COMMUNICATION SYSTEMS

CLAIM OF PRIORITY UNDER 35 U.S.C. §119 AND §120

This application claims benefit under 35 U.S.C. §119(e) from U.S. Provisional Patent application Ser. No. 60/733,022 entitled "ANTENNA ARRAY CALIBRATION FOR WIRELESS COMMUNICATION SYSTEMS", filed Nov. 2, 2005, and also claims benefit under 35 U.S.C. §120 to application Ser. No. 11/398,077 entitled "ANTENNA ARRAY CALIBRATION FOR WIRELESS COMMUNICATION SYSTEMS", filed Apr. 4, 2006, both assigned to the assignee hereof and hereby expressly incorporated by reference herein.

REFERENCE TO CO-PENDING APPLICATIONS FOR PATENT

The present Application for Patent is related to the following U.S. patent application Ser. No. 11/405,944: "ANTENNA ARRAY CALIBRATION FOR MULTI-INPUT MULTI-OUTPUT WIRELESS COMMUNICATION SYSTEMS" by Ayman Fawzy Naguib and Alexei Gorokhov, filed concurrently herewith, assigned to the assignee hereof, and expressly incorporated by reference herein.

BACKGROUND

I. Field

The following description relates generally to wireless communications, and, amongst other things, to over-the-air calibrating an antenna array.

II. Background

Wireless networking systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

More particularly, frequency division based techniques typically separate the spectrum into distinct channels by splitting it into uniform chunks of bandwidth, for example, division of the frequency band allocated for wireless cellular telephone communication can be split into channels, each of which can carry a voice conversation or, with digital service, carry digital data. Each channel can be assigned to only one user at a time. One commonly utilized variant is an orthogonal frequency division technique that effectively partitions the overall system bandwidth into multiple orthogonal subcarriers. These subcarriers are also referred to as tones, carriers, bins, and/or frequency channels. With time division based techniques, a band is split time-wise into sequential time slices or time slots. Each user of a channel may be provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations. For example, the aforementioned variations can affect base station scheduling, power control and/or rate prediction for one or more mobile terminals.

When antenna arrays and/or base stations are employed in conjunction with a time domain duplexed (TDD) channel transmission technique, very large gains can be realized. A key assumption in realizing these gains is that due to the TDD nature of the transmission and reception, both the forward link (FL) and reverse link (RL) observe similar physical propagation channels corresponding to a common carrier frequency. However, in practice the overall transmit and receive chains, which can include the analog front ends and the digital sampling transmitters and receivers, as well as the physical cabling and antenna architecture, contribute to the overall channel response experienced by the receiver. In other words, the receiver will see an overall or equivalent channel between the input of the transmitter digital to analog converter (DAC) and the output of the receiver analog to digital converter (ADC), which can comprise the analog chain of the transmitter, the physical propagation channel, the physical antenna array structure (including cabling), and the analog receiver chain.

In view of at least the above, there exists a need in the art for a system and/or methodology of calibrating in antenna arrays employed in wireless communication devices.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a method of calibrating an antenna array in a wireless network comprises determining calibration based upon at least first and second calibration techniques, and then selecting to calibrate based upon one of the techniques.

According to another aspect, a wireless communication apparatus comprises at least two antennas and a processor coupled with the at least two antennas. The processor is configured to determine calibration for communication including the at least two antennas calibration based upon at least first and second calibration techniques, and then selecting to calibrate based upon one of the techniques.

According to yet another aspect, an apparatus can comprise means for determining calibration based upon at least first and second calibration techniques, and then selecting to calibrate based upon one of the techniques.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
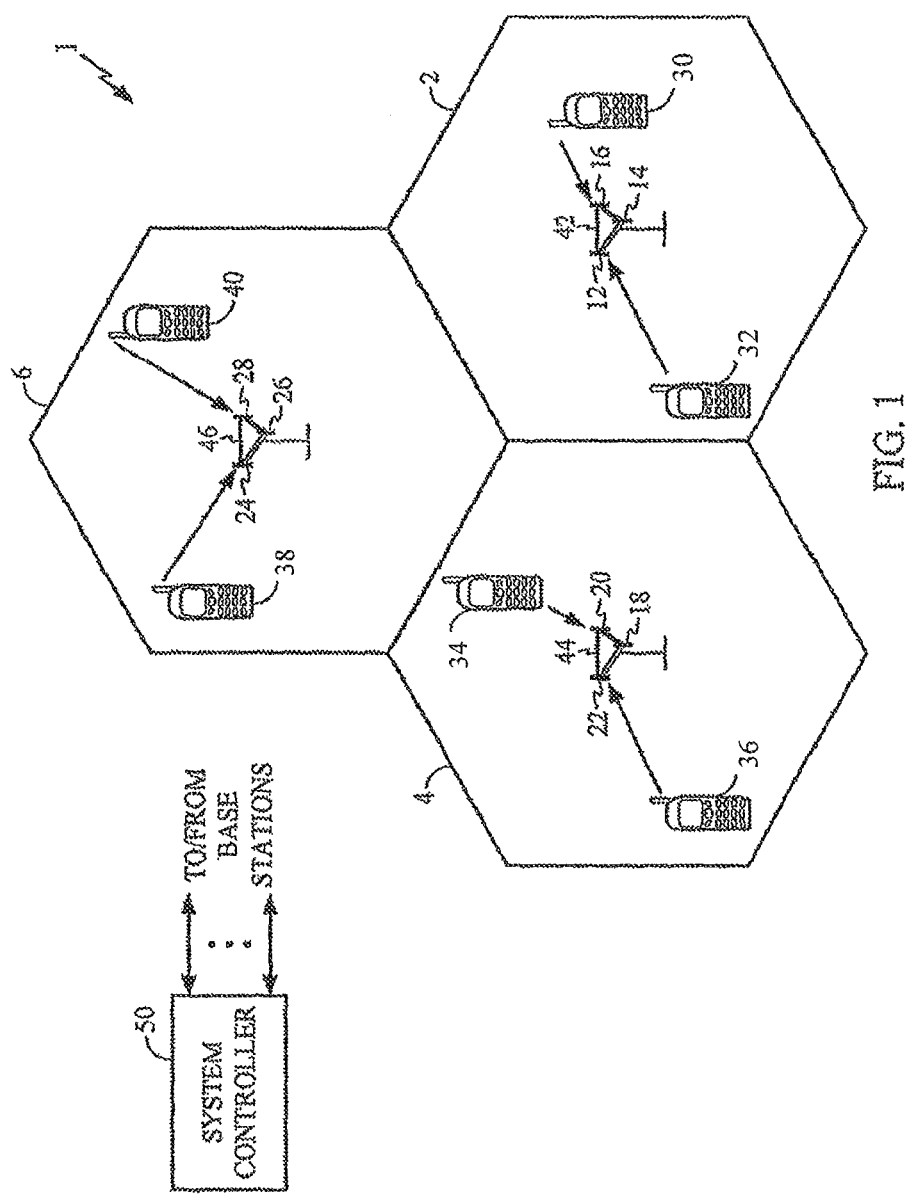
FIG. 1 illustrates aspects of a multiple access wireless communication system

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a subscriber station. A subscriber station can also be called a system, a subscriber unit, mobile station, mobile, remote station, access point, base station, remote terminal, access terminal, user terminal, user agent, user equipment, etc. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, flash memory devices (e.g., card, stick, key drive . . . ), and integrated circuits such as read only memories, programmable read only memories, and electrically erasable programmable read only memories.

Referring to FIG. 1, a multiple access wireless communication system according to one embodiment is illustrated: A multiple access wireless communication system 1 includes multiple cells, e.g. cells 2, 4, and 6. In FIG. 1, each cell 2, 4, and 6 may include an access point that includes multiple sectors. The multiple sectors are formed by groups of antennas each responsible for communication with access terminals in a portion of the cell. In cell 2, antenna groups 12, 14, and 16 each correspond to a different sector. In cell 4, antenna groups 18, 20, and 22 each correspond to a different sector. In cell 6, antenna groups 24, 26, and 28 each correspond to a different sector.

Each cell includes several access terminals which are in communication with one or more sectors of each access point. For example, access terminals 30 and 32 are in communication with access point base 42, access terminals 34 and 36 are in communication with access point 44, and access terminals 38 and 40 are in communication with access point 46.

Controller 50 is coupled to each of the cells 2, 4, and 6. Controller 50 may contain one or more connections to multiple networks, e.g. the Internet, other packet based networks, or circuit switched voice networks that provide information to, and from, the access terminals in communication with the cells of the multiple access wireless communication system 1. The controller 50 includes, or is coupled with, a scheduler that schedules transmission from and to access terminals. In other embodiments, the scheduler may reside in each individual cell, each sector of a cell, or a combination thereof.

In order to facilitate calibration of transmissions to the access terminals, it is helpful to calibrate the access point gain calibration loop to deal with mismatches due to the transmit and receive chains of the access point. However, due to the noise in the channel, any calibration estimates based on the signals received at the access terminals, forward link, and transmitted from the access terminals, reverse link, may contain noise and other channel variations that may call into question the estimates provided. In order to overcome the channel noise effects, multiple calibrations on both the forward link and reverse link are utilized for multiple access terminals. In certain aspects, multiple transmissions to and from each access terminal are taken into account to perform calibration of a given sector.

In certain aspects, either the transmit chain of the access point or receive chain of the access point may be calibrated. This may be done, for example, by utilizing a calibration ratio to calibrate the receive chain of the access point to its transmit chain or calibrate its transmit chain to its receive chain.

As used herein, an access point may be a fixed station used for communicating with the terminals and may also be referred to as, and include some or all the functionality of, a base station, a Node B, or some other terminology. An access terminal may also be referred to as, and include some or all the functionality of, a user equipment (UE), a wireless communication device, terminal, a mobile station or some other terminology.

It should be noted that while FIG. 1, depicts physical sectors, i.e. having different antenna groups for different sectors, other approaches may be utilized. For example, utilizing multiple fixed "beams" that each cover different areas of the cell in frequency space may be utilized in lieu of, or in combination with physical sectors. Such an approach is depicted and disclosed in copending U.S. patent application Ser. No. 11/260,895, entitled "Adaptive Sectorization In Cellular System," which is incorporated herein by reference.

Figure 2:
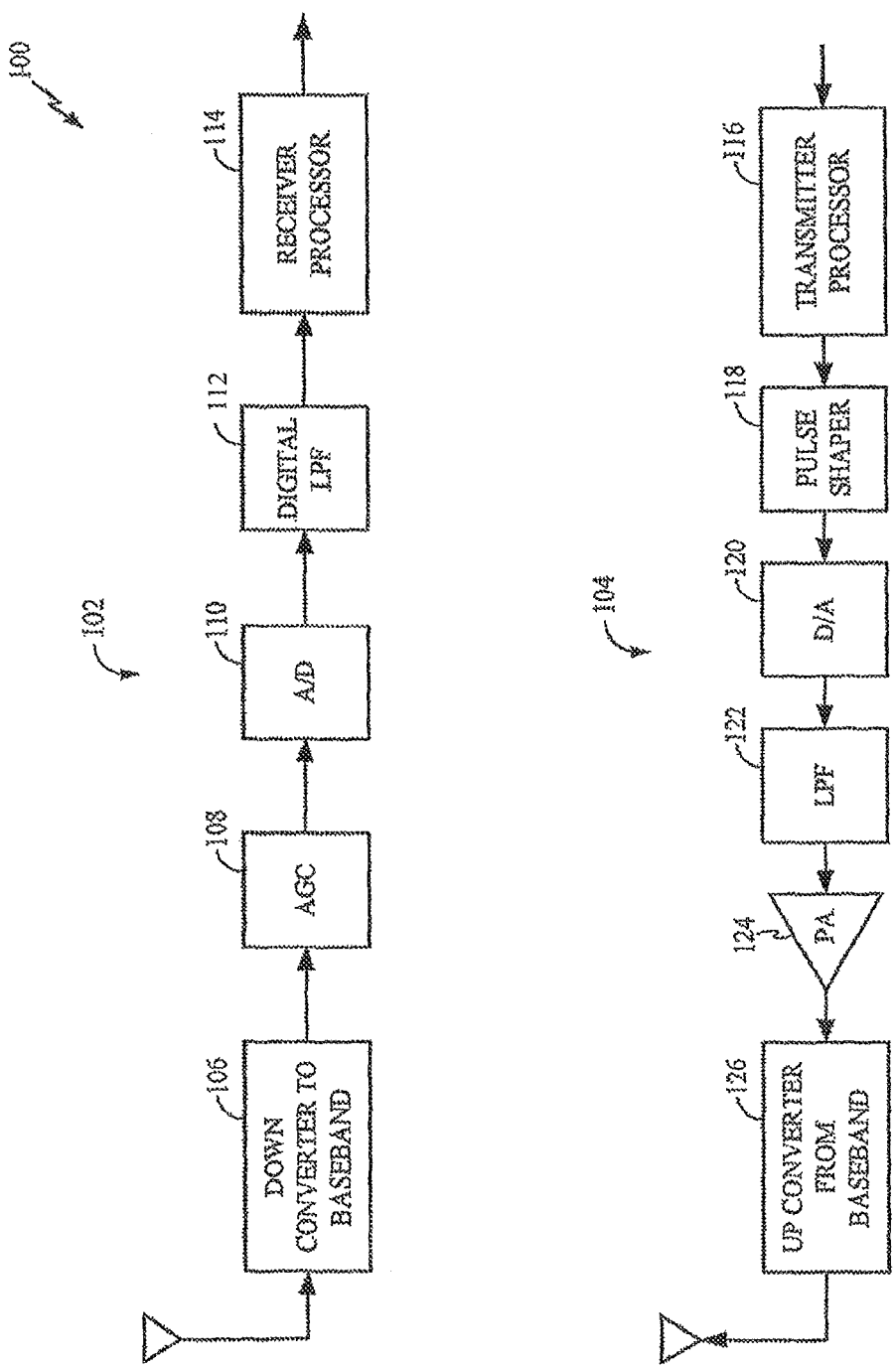
FIG. 2 illustrates an antenna arrangement comprising a receiver chain and a transmitter chain in accordance with various aspects described herein.

Referring to FIG. 2, an antenna arrangement 100 comprising a receiver chain 102 and a transmitter chain 104 in accordance with various aspects described herein. Receiver chain 102 comprises a down converter component 106 that down converts a signal to a baseband upon receipt. Down converter component 106 is operatively connected to an automatic gain control (AGC) functionality 108 that assesses received signal strength and automatically adjusts a gain applied to the received signal to maintain receiver chain 102 within its associated linear operation range and to provide a constant signal strength for outputting through transmitter chain 104. It will be appreciated that AGC 108 can be optional to some embodiments described herein (e.g., automatic gain control need not be performed in conjunction with every embodiment). AGC 108 is operatively coupled to an analog-to-digital (A/D) converter 110 that converts the received signal to digital format before the signal is smoothed by a digital low-pass-filter (LPF) 112 that can mitigate short-term oscillations in the received signal. Finally, receiver chain 102 can comprise a receiver processor 114 that processes the received signal and can communicate the signal to one or more components of transmitter chain 104.

Transmitter chain 104 can comprise a transmitter processor 116 that receives a signal from receiver chain 102 (e.g., transmitter receives a signal that was originally received by receiver chain 102 and subjected to various processes associated with the components thereof, . . . ). Transmitter processor 116 is operatively coupled to a pulse shaper 118 that can facilitate manipulating a signal to be transmitted such that the signal can be shaped to be within bandwidth constraints while mitigating and/or eliminating inter-symbol interference. Once shaped, the signal can undergo digital-to-analog (D/A) conversion by a D/A converter 120 before being subjected to an operatively associated low-pass filter (LPF) 122 in transmitter chain 104 for smoothing. A pulse amplifier (PA) component 124 can amplify the pulse/signal before up-conversion to the baseband by an up-converter 126.

Antenna array 100 may exist for each antenna of both an access point and access terminal. As such, there may be a noticeable difference observed between transfer characteristics of transmitter chain 104 and receiver chain 102 and/or samples thereof, reciprocity of the equivalent channel and/or transmitter/receiver variations may not be assumed. When calibrating an array of antennas 100, an understanding of the magnitude of variations, in terms of the effects on the phase and/or amplitude, of signals propagated along the transmitter and receiver chains and their influence on the accuracy of a reciprocity assumption may be utilized in order to facilitate the calibration process. Furthermore, in the case of an antenna array, generally each antenna 100 has a different transmitter chain 104 and a receiver chain 102 than each other antenna. Therefore, each different transmitter chain 104 may have different effects, in terms of phase and/or amplitude, as any other transmitter chain 104, respectively. The same can be true for receiver chains 102 of each antenna 100.

The mismatches in the effects can be due to the physical structure of the antenna 100, component differences, or a number of other factors. Such mismatches can include, for example, mutual coupling effects, tower effects, imperfect knowledge of element locations, amplitude and/or phase mismatches due to antenna cabling, and the like. Additionally, mismatches can be due to hardware elements in transmitter chain 104 and/or receiver chain 102 of each antenna 100. For example, such mismatches can be associated with analog filters, I and Q imbalance, phase and/or gain mismatch of a low-noise amplifier or a pulse amplifier in the chains, various non-linearity effects, etc.

For an access point, to calibrate each transmit chain to its corresponding receive chain (i.e. the receive chain corresponding to the same antenna) independently would require a complex and potentially unwieldy process. Further, any specific feedback, for forward link transmission, or pilots, used for reverse link transmission, for any given access terminal is subject to the noise for that user. Therefore, for any given calibration ratio estimated based on both the forward and reverse links, there is some error introduced by the channel variation and noise. Therefore, in several aspects, one or more calibration ratios estimated for a number of different access terminals are combined in order to obtain a single calibration ratio to be used by the access point for transmission to one or all of the access terminals. In certain aspects, the combination may constitute an average of all of the calibration ratios for each access terminal communicating with the access point, or some predetermined subset. In another aspect, the combination may be done in a joint optimization fashion where the channel measurements from and for each access terminal are combined to estimate a single calibration ratio that is a combination of the gain mismatches for each access terminal, without calculating an individual calibration ratio for each access terminal.

For any given access terminal, the access point uses its reverse link channel estimates for that access terminal as well as the forward link channel estimates, which are performed at the access terminal and fed back to the access point, in order to estimate or calculate the calibration ratio, based on that access terminal.

A forward link channel estimate, $\hat{h}_{AT}^{(i)}$, may be estimated at the access terminal for transmissions from the access point's i-th transmit antenna. However, any channel estimate will have components related to the noise of the channel, along with any gain or distortion caused by the access points transmit chain and the access terminals receive chain. The forward link channel estimate may then be written as:

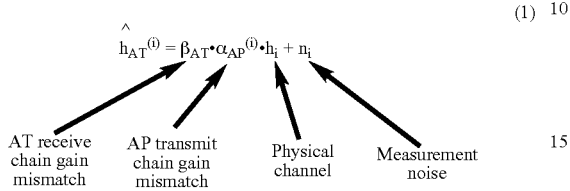

$$\hat{h}_{AT}^{(i)} = \beta_{AT} \cdot \alpha_{AP}^{(i)} \cdot h_i + n_i \tag{1}$$

(AT receive chain gain mismatch, AP transmit chain gain mismatch, Physical channel, Measurement noise)

In Equation 1, channel estimate is a function of the gain mismatch $\beta_{AT}$ of the access terminal receiver chain, the gain mismatch $\alpha_{AP}^{(i)}$ of the transmitter chain of the access point, $h_i$ which is the physical channel between the two antennas being measured, and the noise $n_i$ of the channel that is part of the channel estimate.

In the case of reverse link transmissions the channel estimate at the access point's i-th receive antenna due to transmission from the $\hat{h}_{AP}^{(i)}$ is essentially an inverse of Equation 1. This can be seen in Equation 2 below:

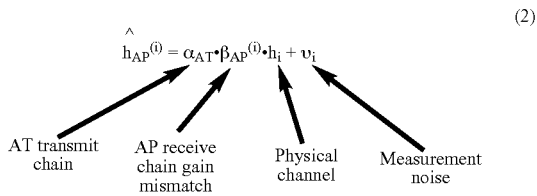

$$\hat{h}_{AP}^{(i)} = \alpha_{AT} \cdot \beta_{AP}^{(i)} \cdot h_i + \upsilon_i \tag{2}$$

(AT transmit chain, AP receive chain gain mismatch, Physical channel, Measurement noise)

In Equation 2, this channel estimate is a function of the gain mismatch $\alpha_{AT}$ of the access terminal transmit chain, the gain mismatch $\beta_{AP}^{(i)}$ of the access point receiver chain, $h_i$ which is the physical channel between the two antennas being measured, and the noise $\upsilon_i$ of the channel that is part of the channel estimate.

In order to calibrate the antenna array the mismatch errors between receiver chains 102 and transmitter chains 104 of antennas 100 therein is shown below in equation 3. It should be noted that other methodologies and mathematical relationships may be employed to achieve array calibration in conjunction with, in lieu of, the methodologies and mathematical relationships described herein.

$$c_i = \frac{\hat{h}_{AP}^{(i)}}{\hat{h}_{AT}^{(i)}} = \frac{\alpha_{AT}}{\beta_{AT}} \cdot \frac{\beta_{AP}^{(i)}}{\alpha_{AP}^{(i)}} = \gamma \cdot \frac{\beta_{AP}^{(i)}}{\alpha_{AP}^{(i)}} = \gamma \cdot \eta_i \tag{3}$$

In Equation 3, $c_i$ is the overall mismatch ratio between reverse link transmissions and forward link transmission, $\gamma$ is the mismatch ratio of the gains between transmit and receive chains of the access terminal, and $\eta_i$ is the mismatch ratio of the receive and transmit chains for the ith antenna at the access point. It should be noted that $\gamma$ is substantially constant for each antenna pair at the access point. Also, in some regards Equation 3 is idealized, as the noise estimate is not included therein.

The calibration ratios $c_i$, $i=1, \ldots, M$, where M is the number of antennas in the access point antenna array can be grouped into one vector $\tilde{c}$, for each access terminal, which may be termed a "calibration vector."

$$\tilde{c} = \begin{bmatrix} \tilde{c}_1 \\ \tilde{c}_2 \\ \vdots \\ \tilde{c}_M \end{bmatrix} = \gamma \cdot \begin{bmatrix} \eta_1 \\ \eta_2 \\ \vdots \\ \eta_M \end{bmatrix} + \begin{bmatrix} z_1 \\ z_2 \\ \vdots \\ z_M \end{bmatrix} = \gamma \cdot \eta + n \tag{4}$$

In Equation 4, the entries of vector $\tilde{c}$ correspond to the estimates for each antenna of the access point with respect to a single access terminal. It should be noted that the elements of vector $\hat{c}$ may be complex numbers including both the amplitude and phase mismatch for each transmit and receive chains of the access point antenna array as well as common mismatch corresponding to the transmit and receive mismatch of the access terminal transmit and receive chains. It should be noted that while Equation 4, describes a vector that has entries for one access terminal antennas, it may include entries for multiple access terminals.

The noise vector n includes effects of channel measurement errors (MSE) and also the effects of channel measurement de-correlation, since the measurements of the gains are performed at different times thus allowing channel variation over time as well as temperature and other variations to effect the measurement.

An estimated calibration vector $\tilde{c}_u$ corresponding to access terminal u, may be determined as shown below in Equation 5.

$$\tilde{c}_u = \gamma_u \cdot \eta \tag{5}$$

where $\gamma_u$ is the gain mismatch corresponding to the access terminal transmit and receive chains and $\eta$ is the mismatch vector corresponding to the access point antenna array transmit and receive chains. The vector $\tilde{c}_u$ is determine for all of the antennas of the access point antenna array.

In the above it should be noted that there are several methods to combine different calibration vector estimates (corresponding to measurements from different access terminals) to generate an overall or combined calibration vector. One way to do this combination is to average all the calibration vector estimates to obtain a single estimate.

In this approach, each calibration vector estimate includes a multiplicative factor, $\gamma_u$, which is different for different access terminals. In a case where one or more access terminals have a very large gain mismatch $\gamma_u$, simple averaging may lead to results s bias the average toward the access terminals having the largest gain mismatch $\gamma_u$.

In another aspect, each calibration vector estimate, corresponding to a specific access terminal, is normalized according to an element of the vector. This may provide minimization in those cases where one or more access terminals have high gain mismatch $\gamma_u$. This process is depicted below in Equation 6.

$$\overline{c}_u = \frac{\tilde{c}_u}{\tilde{c}_{u,1}}, \tilde{c} = \frac{1}{U} \sum_{u=1}^{U} \overline{c}_u \tag{6}$$

It should be noted that, in certain aspects, the normalizing element may be any element of the calibration vector, as long as it is the same element for each calibration vector estimate, e.g. the first element. The sum of the normalized elements is then divided by the total number of elements U of the vector $\tilde{c}$.

Another approach that may be utilized to combine different calibration vector estimates may be based upon combining the estimated vectors in a matrix. For instance, in certain aspects, it may that that each calibration vector estimate is a rotated and scaled version of the same vector η and the rotation and scaling are due to the different access terminal mismatches $\gamma_u$. One way to get rid of this scaling and rotation is to first normalize each calibration vector to have a unit norm. Then, a matrix Q whose columns are the normalized calibration vector estimates may be formed from the calibration vectors. A single estimate for the calibration vector is obtained by performing a decomposition of the matrix, e.g. a singular value decomposition on the matrix Q. The eigenvector corresponding to the maximum singular value may be used as the overall calibration vector estimate, e.g. as shown in Equation (7) below.

$$Q = [\hat{c}_1 \ \hat{c}_2 \ \cdots \ \hat{c}_U], \hat{c}_j = \frac{\hat{c}_j}{\|\hat{c}_j\|} \ j = 1, \ldots, U \quad (7)$$

$$SVD(Q) = U \cdot S \cdot V$$

As exemplified in the three approaches above, a calibration ratio is generally estimated in two steps. First, values corresponding to the elements of calibration vectors are calculated for the antenna array, or those antennas of interest, with respect to the individual access terminals. The calibration vectors are then combined according to one or more different mathematical processes.

An alternative to calculating multiple calibration vectors is to utilize a joint optimization procedure using multiple access point and access measurement as follows. In some cases, the access terminal and access point may generate their channel estimates for different frequency tones and at different time instants. Further, there may be a timing error of $\tau_{k,u}$ between the access point and the u-th access terminal at time k. In such a case, the forward link channel vector estimate $g_{i,k,u}$ measured at the access terminal may be related to the reverse link channel vector estimate $h_{i,k,u}$ measured at the access point. One approach, utilizing the calibration vector η, and the access terminal mismatch $\gamma_u$ is depicted in Equation 8 below.

$$g_{i,k,u} = \gamma_u \cdot e^{-j\omega_i \tau_u} \cdot \mathrm{diag}(h_{i,k,u}) \cdot \eta + n_{i,k,u} \quad (8)$$
$$= \gamma_{i,k,u} \cdot Z_{i,k,u} \cdot \eta + n_{i,k,u}$$

In Equation 8, $Z_{i,k,u}$ is a diagonal matrix whose diagonal elements are the elements of the reverse link channel vector estimate $h_{i,k,u}$ and $\gamma_{i,k,u} = \gamma_u \cdot e^{-j\omega_i \tau_u}$. The subscripts i,k,u, are the tone, time, and user indexes, respectively. In the above equation, the unknowns are the calibration vector η and the access terminal specific mismatch $\gamma_{i,k,u}$. A feature of Equation 8 is that access terminal mismatch includes the effect of the timing mismatch between the access point and the access terminal in addition to the gain mismatch due to the access terminal transmit and receive chains. One way to obtain a solution for η and $\gamma_{i,k,u}$ is to utilize a minimum mean squared error (MMSE) approach as shown in Equation 9.

$$\rho @ \sum_{i,k,u} \|\overline{\gamma}_{i,k,u} \cdot g_{i,k,u} - Z_{i,k,u} \cdot \eta\|^2 \quad (9)$$

$$\{\eta, \overline{\gamma}_{i,k,u}\} = \underset{\eta, \overline{\gamma}_{i,k,u}}{\mathrm{argmin}} \rho_u(\eta, \overline{\gamma}_{i,k,u}) \ s.t. \ \|\eta\| = 1$$

Solutions for η and $\gamma_{i,k,u}$ may be given by Equation 10 below.
η@ minimal eigenvector of $$F = \sum_u F_u = \sum_{i,k,u} Z_{i,k,u}^* \cdot \prod_{g_{i,k,u}}^{\perp} \cdot Z_{i,k,u} \quad (10)$$

$$\gamma_{i,k,u} = \frac{g_{i,k,u}^* \cdot Z_{i,k,u} \cdot \eta}{g_{i,k,u}^* g_{i,k,u}}$$

where, for a vector x, the orthogonal projection operator $\Pi_x^{\perp}$ may be defined as $$\prod_x^{\perp} = I - \frac{xx^*}{x^*x} \quad (11)$$

To compensate by the mismatches, the calibration ratios may be used to alter the gain, in terms of both or either the phase and amplitude, of the transmitter chain of the access point to match it to the receiver chain or equivalently to alter the gain of the receive chain of the access point to match it to the transmit chain.

In certain aspects, it may also be desired to calibrate the gain with respect to phase only or both phase and the amplitude. This is because, in certain instances, any calibration technique may make the amplitude mismatch worse. This can be easily seen by considering an extreme case where there is no phase mismatch and only amplitude mismatch is present in the gain mismatches. In this case, the beamforming gain with calibration is worse than the beamforming gain without calibration, which means that the amplitude mismatch is now worse. A method to improve is to use phase only calibration for beamforming, instead of calibration using both the amplitude and the phase for calculating the calibration weights. In this case the calibrated weights beamforming are calculated for phase only. An aspect of this approach for MRC beamforming is depicted in Equation 12 below.

$$w_{MRC} = \mathrm{diag}(\eta_\phi) \cdot h^*/|h|, |h| = \sqrt{h^*h} \ \text{for MRC} \quad (12)$$

where diag($\eta_{100}$)=diag(@η).

While FIG. 2, depicts and describes one embodiment of receiver chain 102 and transmitter chain 104 other layouts and structures may be utilized. For example, a different number of components may be used in both receiver chain 102 and transmitter chain 104. Additionally, different devices and structures may also be substituted.

Figure 3:
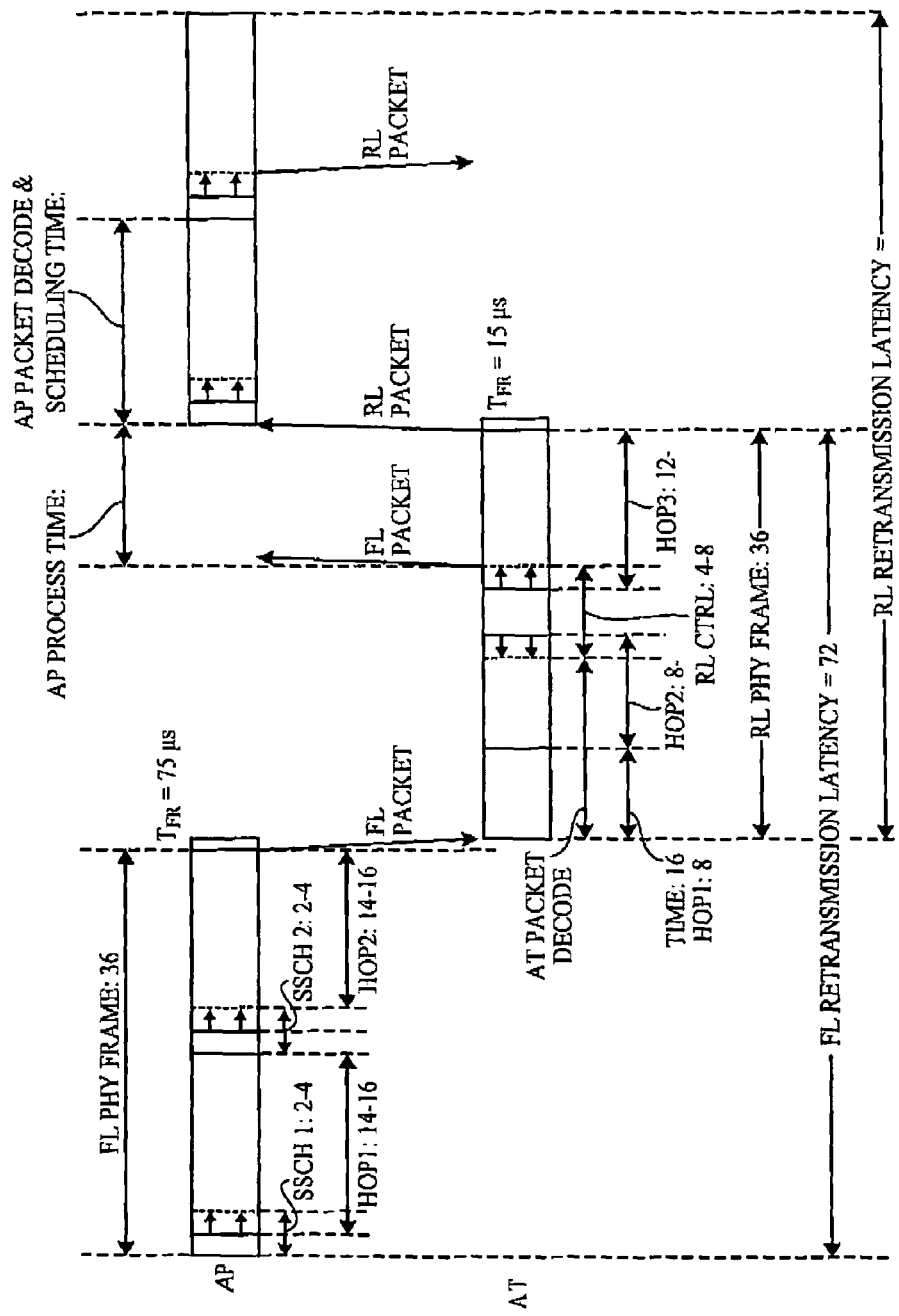
FIG. 3 illustrates aspects timing for calibration operations.

FIG. 3 illustrates a timing cycle for a calibration from a single access terminal, where a TDD system having a single forward link frame or burst adjacent to a single reverse link frame or burst is utilized. As can be seen, one or more pilots transmitted on the reverse link is(are) measured at the access point. The time period of the measurement is a function of the decoding time of the access point. During this decoding period one or more pilots are transmitted on the forward link to the access terminal. The access terminal then measures the pilots to estimate the forward link channel. As with the reverse link estimates, some decoding lag exists. The decoded forward link estimates need to be transmitted back to the access point in order to generate the calibration ratio. Therefore, it can be seen that there is some minimum amount of time, and therefore maximum access terminal velocity, for which calibration can be maintained without drift being a strong or substantially interfering factor.

As can be seen from FIG. 3, if multiple channel estimates from multiple access terminals are utilized the noise and drift associated may be reduced or at least sampled over a range of times and receive chains.

Figure 4:
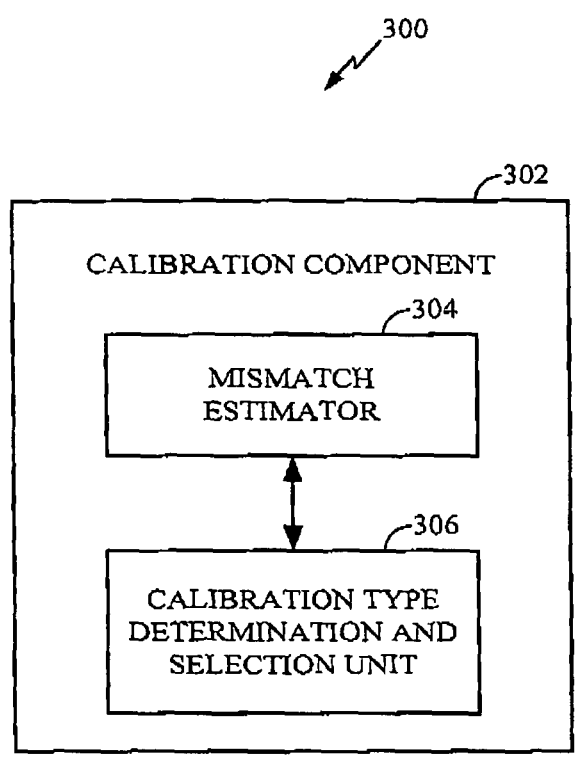
FIG. 4 illustrates aspects of logic that facilitates calibrating an antenna array to compensate for gain mismatch.

FIG. 4 illustrates aspects of logic that facilitates calibrating an antenna array to compensate for gain mismatch. The system 300 comprises a calibration component 302 that includes a mismatch estimation component 304 that analyzes models receiver chain output signals and/or comparisons between receiver chain output signals and a calibration calculation and determination 306 utilizes multiple calibration techniques to generate calibration weights, e.g. using vector η for different types of calibration, and then selects one calibration type based upon the extent of the mismatch that results from using the different types of calibration. In certain aspects, this may be done using phase only estimates to calculate the calibration weights or using phase and amplitude estimates to calculate the calibration weights.

Figure 5:
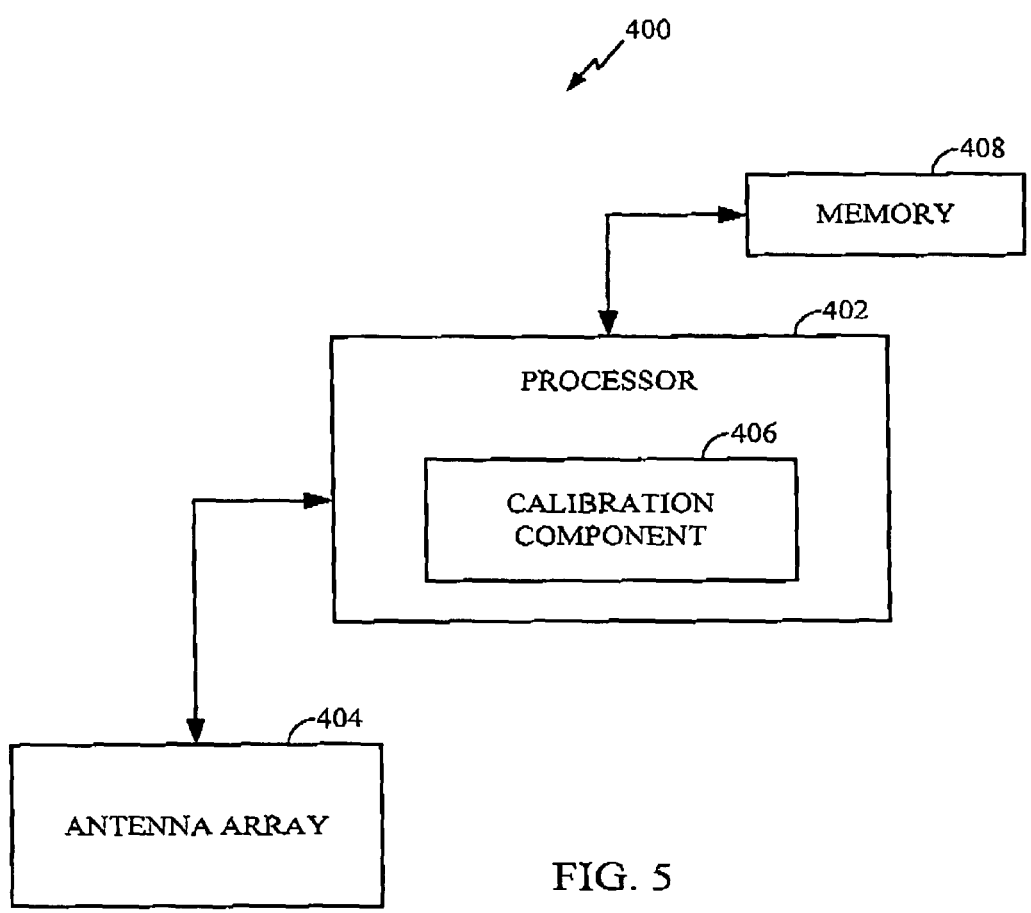
FIG. 5 illustrates aspects of a system that facilitates calibrating an antenna array to compensate for gain mismatch.

FIG. 5 illustrates aspects of a system that facilitates calibrating an antenna array to compensate for gain mismatch. The system 400 comprises a processor 402 that is operatively coupled to an antenna array 404. Processor 402 can determine calibration weights based upon multiple calibration techniques. Processor 402 further comprises a calibration component 406 that selects one calibration type based upon the extent of the mismatch that results from using the different types of calibration.

System 400 can additionally comprise memory 408 that is operatively coupled to processor 402 and that stores information related to array calibration, ratio generation, different types of calibration techniques, criteria for selecting different types of calibration techniques, and any other suitable information related to calibrating antenna array 404. It is to be appreciated that processor 402 can be a processor dedicated to analyzing and/or generating information received by processor 402, a processor that controls one or more components of system 400, and/or a processor that both analyzes and generates information received by processor 402 and controls one or more components of system 400.

Memory 408 can additionally store protocols associated with generating signal copies and models/representations, mismatch estimations, etc., such that system 400 can employ stored protocols and/or algorithms to achieve antenna calibration, technique selection, and/or mismatch compensation as described herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 408 of the subject systems and methods is intended to comprise, without being limited to, these and any other suitable types of memory.

Figure 6:
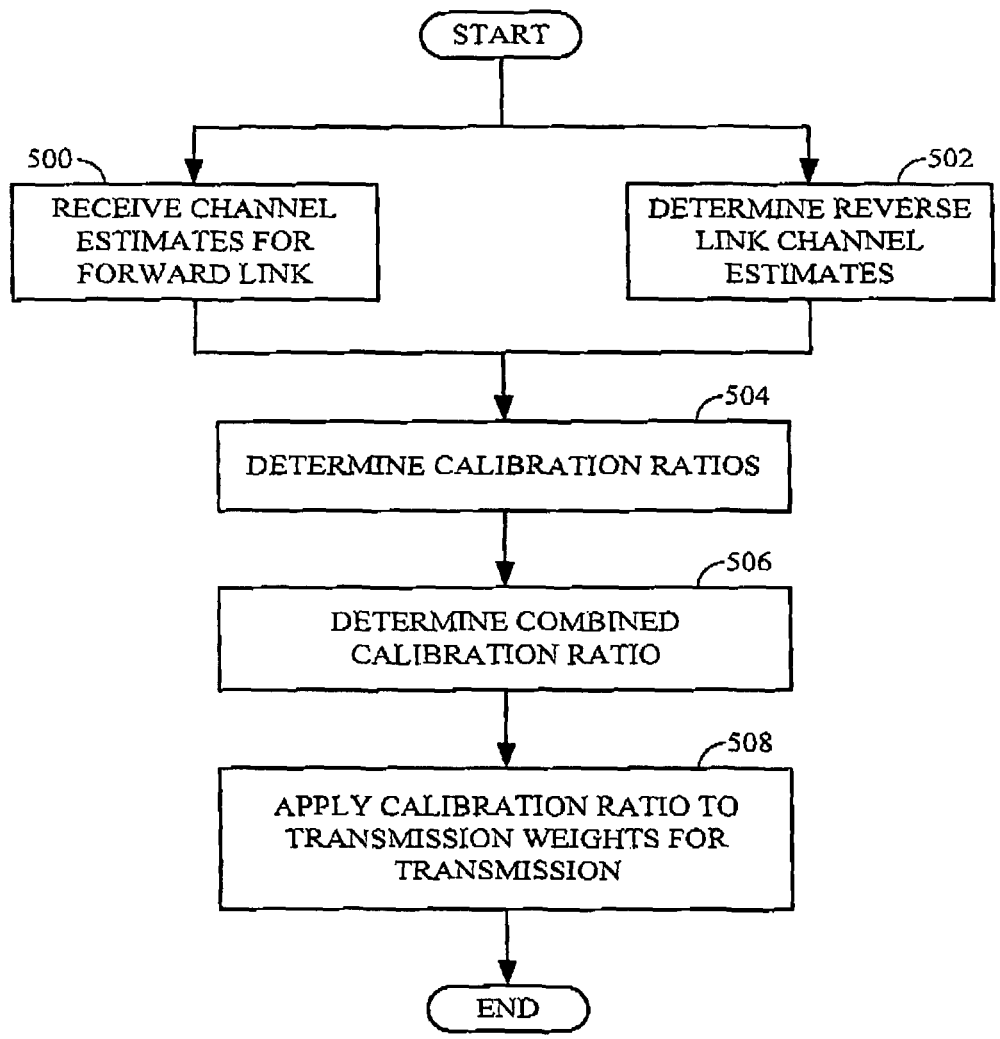
FIG. 6 illustrates aspects of a methodology for calibrating an array of antennas.

Referring to FIG. 6, a methodology relating to generating supplemental system resource assignments are illustrated. For example, methodologies can relate to antenna array calibration in a TDMA environment, an OFDM environment, an OFDMA environment, a CDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

In certain aspects, memory 408 can store the calibration vectors $\tilde{c}_u$ for each state, i.e. level of amplification, of the AGC. In such aspects, for each transmission, the processor 402 may access the calibration vector $\tilde{c}_u$ for the AGC state without performing a calibration. The decision as to whether to perform an additional calibration or access a prior calibration vector $\tilde{c}_u$ for a give transmission may be based upon a time period or number of transmissions since the calibration vector $\tilde{c}_u$ for the AGC state was obtained. This may be system parameter or may vary based upon channel conditions, e.g. loading of the channel.

FIG. 6 illustrates a methodology for calibrating an array of antennas for transmission. Channel estimates for the forward link are received from access terminals, block 500. As discussed above, these channel estimates may be generated from forward link pilots transmitted by the access point. Additionally, channel estimates for the reverse link information, e.g. reverse link channel pilots, are generated by the access point, block 502.

After both forward link and reverse link channel estimates are collected, calibration ratios for each access terminal and access point antenna may be determined, block 504. In certain aspects, the most recent forward link and reverse link channel estimate with respect to each other in time is utilized to form a calibration ratio. In such cases, multiple estimates for a given access terminal may be performed based upon consecutive channel estimate pairs of forward link and reverse link estimates.

As discussed with respect to FIG. 3, there may be some time lag between the different calculations and transmissions. Further, the functionality for blocks 500 and 502 may occur substantially simultaneously or at different times for the same or different access terminals. Therefore, a calibration ratio may be determined for a given access terminal based upon channel estimates of the forward link and reverse link transmissions that may or may not be consecutive in time.

The calibration ratios are then combined to form a calibration estimate over multiple access terminals, block 506. This combined calibration ratio may include calibration ratios to some or all of the access terminals in a given sector or cell, and have an unequal or equal number of calibration ratios for each access terminal for which one or more calibration ratios are being obtained.

The combined calibration ratio may be obtained by simply averaging the calibration ratios or utilizing the other approaches discussed with respect to FIG. 2, e.g. the approaches discussed with respect to Equations 5 or 7.

Each transmission from each transmission chain of the access point is then weighted with weights based upon the combined calibration ratio for that transmit chain. Also, a combined or joint set of calibrations weights may be utilized for one or more transmit chains of the access point. Alternatively, it is possible to transmit this combined calibration ratio or a calibration instruction based upon the combined calibration ratio to one or more access terminals. The access terminals would then apply the weights based upon the combined calibration ratio to decoding of the transmissions received at the access terminal.

Also, in some aspects, the calibration weights are utilized for a particular AGC state and not for other AGC states. As such, block 508, would then only apply to the AGC state during block 500.

Figure 7:
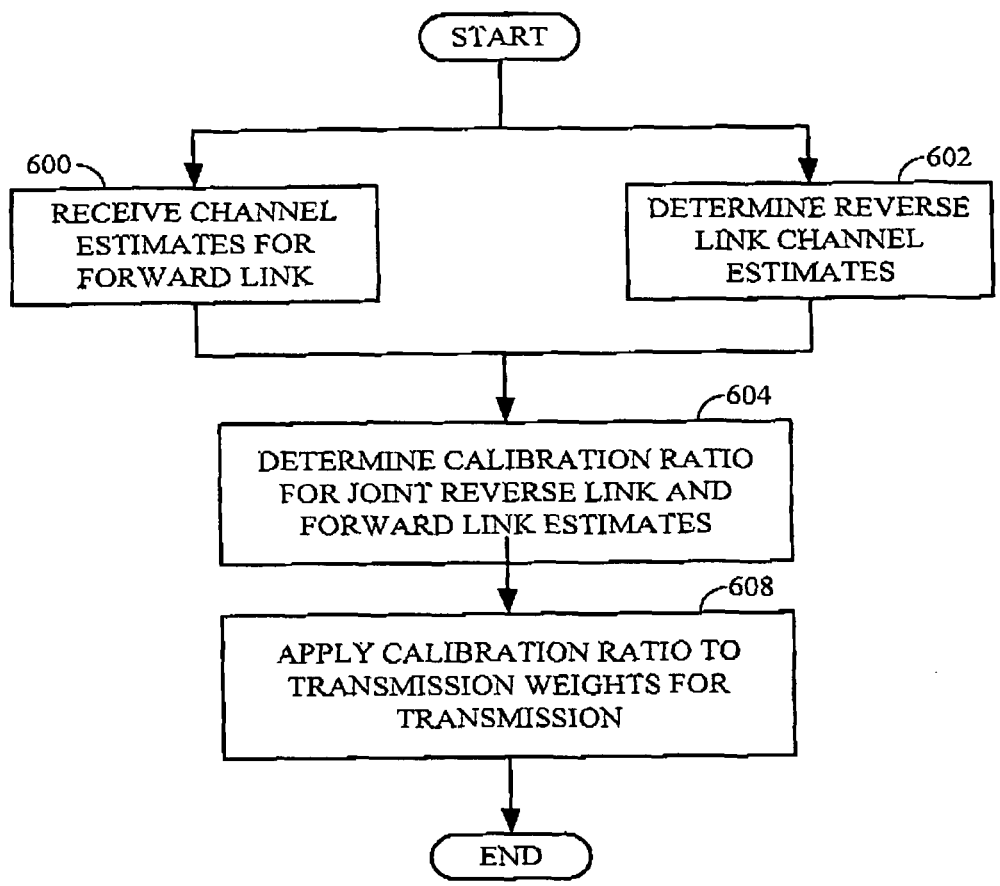
FIG. 7 illustrates aspects of a methodology for calibrating an array of antennas.

FIG. 7 illustrates another methodology for calibrating an array of antennas for transmission. Channel estimates for the forward link are received from access terminals, block 600. As discussed above, these channel estimates may be generated from forward link pilots transmitted by the access point. Additionally, channel estimates for the reverse link information, e.g. reverse link channel pilots, are generated by the access point, block 602.

After both forward link and reverse link channel estimates are collected, a calibration ratio that utilizes multiple channel estimates for multiple access terminals block 604. In certain aspects, the most recent forward link and reverse link channel estimate with respect to each other in time is utilized. In such cases, multiple estimates for a given access terminal may be performed based upon consecutive channel estimate pairs of forward link and reverse link estimates.

As discussed with respect to FIG. 3, there may be some time lag between the different calculations and transmissions. Further, the functionality for blocks 600 and 602 may occur substantially simultaneously or at different times for the same or different access terminals. Therefore, the channel estimates may be determined for a given access terminal based upon channel estimates of the forward link and reverse link transmissions that may or may not be consecutive in time.

The joint calibration ratio may be obtained by utilizing a joint optimization process as discussed with respect to FIG. 2, e.g. to Equation 8.

Each transmission from each transmission chain of the access point is then weighted with weights based upon the joint calibration ratio for that transmit chain. Also, a combined or joint set of calibrations weights may be utilized for one or more transmit chains of the access point. Alternatively, it is possible to transmit this joint calibration ratio or a calibration instruction based upon the joint calibration ratio to one or more access terminals. The access terminals would then apply the weights based upon the joint calibration ratio to decoding of the transmissions received at the access terminal.

Also, in some aspects, the calibration weights are utilized for a particular AGC state and not for other AGC states. As such, block 608, would then only apply to the AGC state during block 600.

Figure 8:
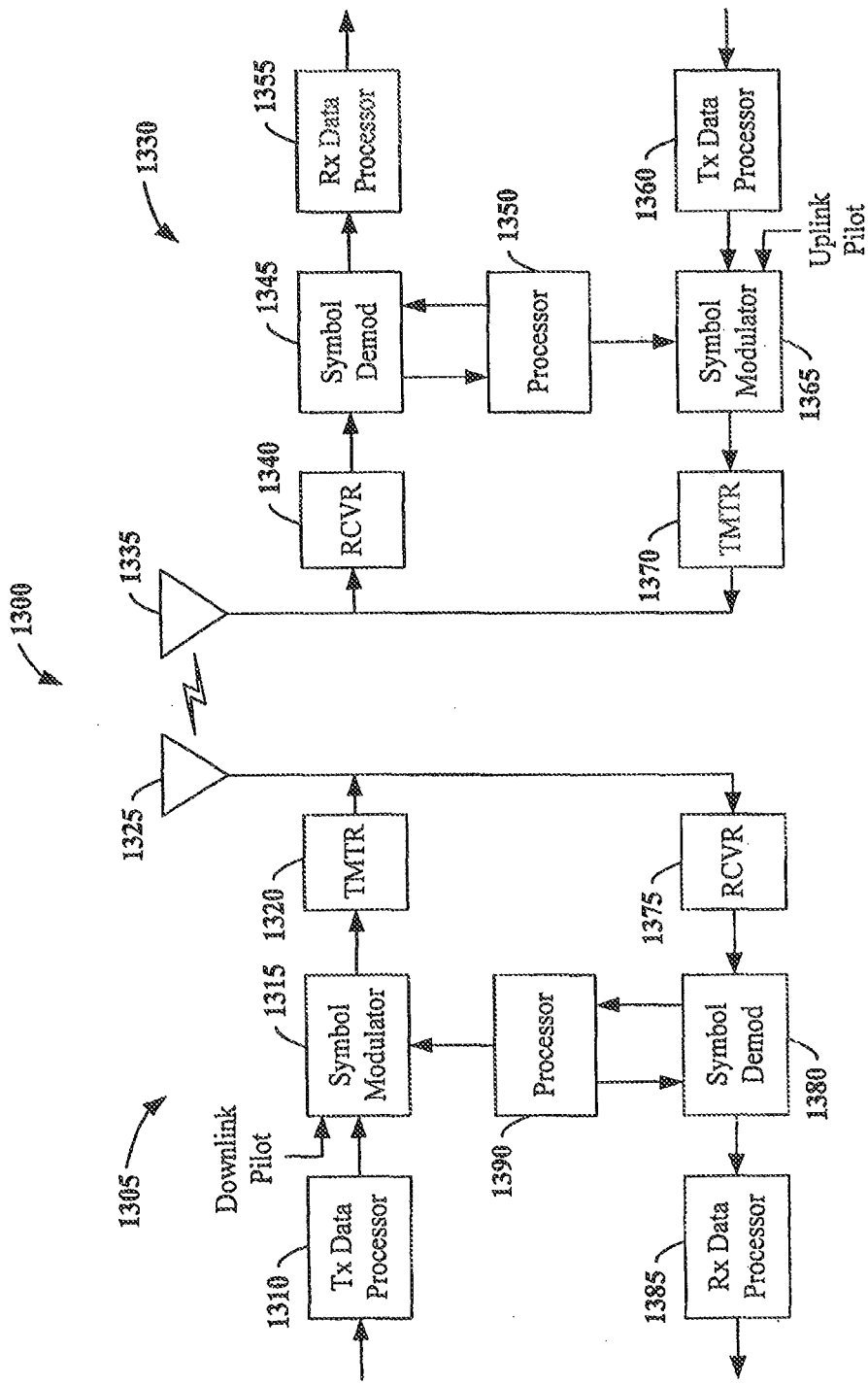
FIG. 8 illustrates aspects of a receiver and transmitter in a wireless communication system

FIG. 8 illustrates an exemplary wireless communication system 1300. The wireless communication system 1300 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 1-5) and/or methods (FIG. 6-7 or 10) described herein to facilitate wireless communication there between.

Referring now to FIG. 8, on a forward link transmission, at access point 1305, a transmit (TX) data processor 1310 receives, formats, codes, interleaves, and modulates (or symbol maps) traffic data and provides modulation symbols ("data symbols"). A symbol modulator 1315 receives and processes the data symbols and pilot symbols and provides a stream of symbols. A symbol modulator 1315 multiplexes data and pilot symbols on the proper subcarriers, provides a signal value of zero for each unused subcarrier, and obtains a set of N transmit symbols for the N subcarriers for each symbol period. Each transmit symbol may be a data symbol, a pilot symbol, or a signal value of zero. The pilot symbols may be sent continuously in each symbol period. It will be appreciated that the pilot symbols may be time division multiplexed (TDM), frequency division multiplexed (FDM), orthogonal frequency division multiplexed (OFDM), code division multiplexed (CDM), etc. Symbol modulator 1315 can transform each set of N transmit symbols to the time domain using an N-point IFFT to obtain a "transformed" symbol that contains N time-domain chips. Symbol modulator 1315 typically repeats a portion of each transformed symbol to obtain a corresponding symbol. The repeated portion is known as a cyclic prefix and is used to combat delay spread in the wireless channel.

A transmitter unit (TMTR) 1320 receives and converts the stream of symbols into one or more analog signals and further conditions (e.g., amplifies, filters, and frequency upconverts) the analog signals to generate a forward link signal suitable for transmission over the wireless channel. The forward link signal is then transmitted through an antenna 1325 to the terminals. At terminal 1330, an antenna 1335 receives the forward link signal and provides a received signal to a receiver unit (RCVR) 1340. Receiver unit 1340 conditions (e.g., filters, amplifies, and frequency downconverts) the received signal and digitizes the conditioned signal to obtain samples. A symbol demodulator 1345 removes the cyclic prefix appended to each symbol, transforms each received transformed symbol to the frequency domain using an N-point FFT, obtains N received symbols for the N subcarriers for each symbol period, and provides received pilot symbols to a processor 1350 for channel estimation. Symbol demodulator 1345 further receives a frequency response estimate for the forward link from processor 1350, performs data demodulation on the received data symbols to obtain data symbol estimates (which are estimates of the transmitted data symbols), and provides the data symbol estimates to an RX data processor 1355, which demodulates (e.g., symbol demaps), deinterleaves, and decodes the data symbol estimates to recover the transmitted traffic data. The processing by symbol demodulator 1345 and RX data processor 1355 is complementary to the processing by symbol modulator 1315 and TX data processor 1310, respectively, at access point 1305.

On the reverse link, a TX data processor 1360 processes traffic data and provides data symbols. A symbol modulator 1365 receives and multiplexes the data symbols with pilot symbols, performs modulation, and provides a stream of symbols. The pilot symbols may be transmitted on subcarriers that have been assigned to terminal 1330 for pilot transmission, where the number of pilot subcarriers for the reverse link may be the same or different from the number of pilot subcarriers for the forward link. A transmitter unit 1370 then receives and processes the stream of symbols to generate a reverse link signal, which is transmitted by the antenna 1335 to the access point 1305.

At access point 1305, the reverse link signal from terminal 1330 is received by the antenna 1325 and processed by a receiver unit 1375 to obtain samples. A symbol demodulator 1380 then processes the samples and provides received pilot symbols and data symbol estimates for the reverse link. An RX data processor 1385 processes the data symbol estimates to recover the traffic data transmitted by terminal 1330. A processor 1390 performs channel estimation for each active terminal transmitting on the reverse link.

Figure 10:
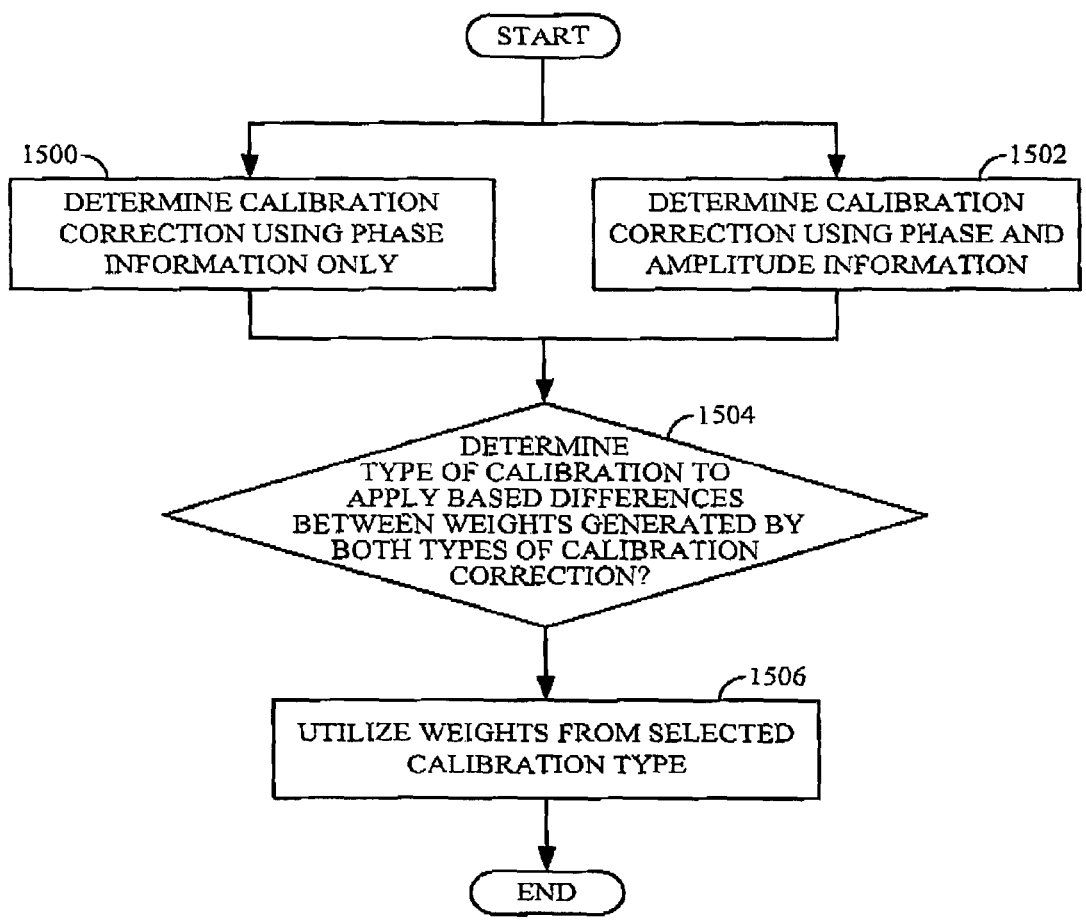
FIG. 10 illustrates aspects of a methodology for determining a type of calibration to apply.

The processor 1390 may also be configured to utilize multiple calibration techniques to calculate the weights for calibration and to select the weights calculated according to one the techniques as discussed with respect to FIGS. 2 and 10.

Processors 1390 and 1350 direct (e.g., control coordinate, manage, etc.) operation at access point 1305 and terminal 1330, respectively. Respective processors 1390 and 1350 can be associated with memory units (not shown) that store program codes and data. Processors 1390 and 1350 can also perform computations to derive frequency and impulse response estimates for the reverse link and forward link, respectively.

Figure 9:
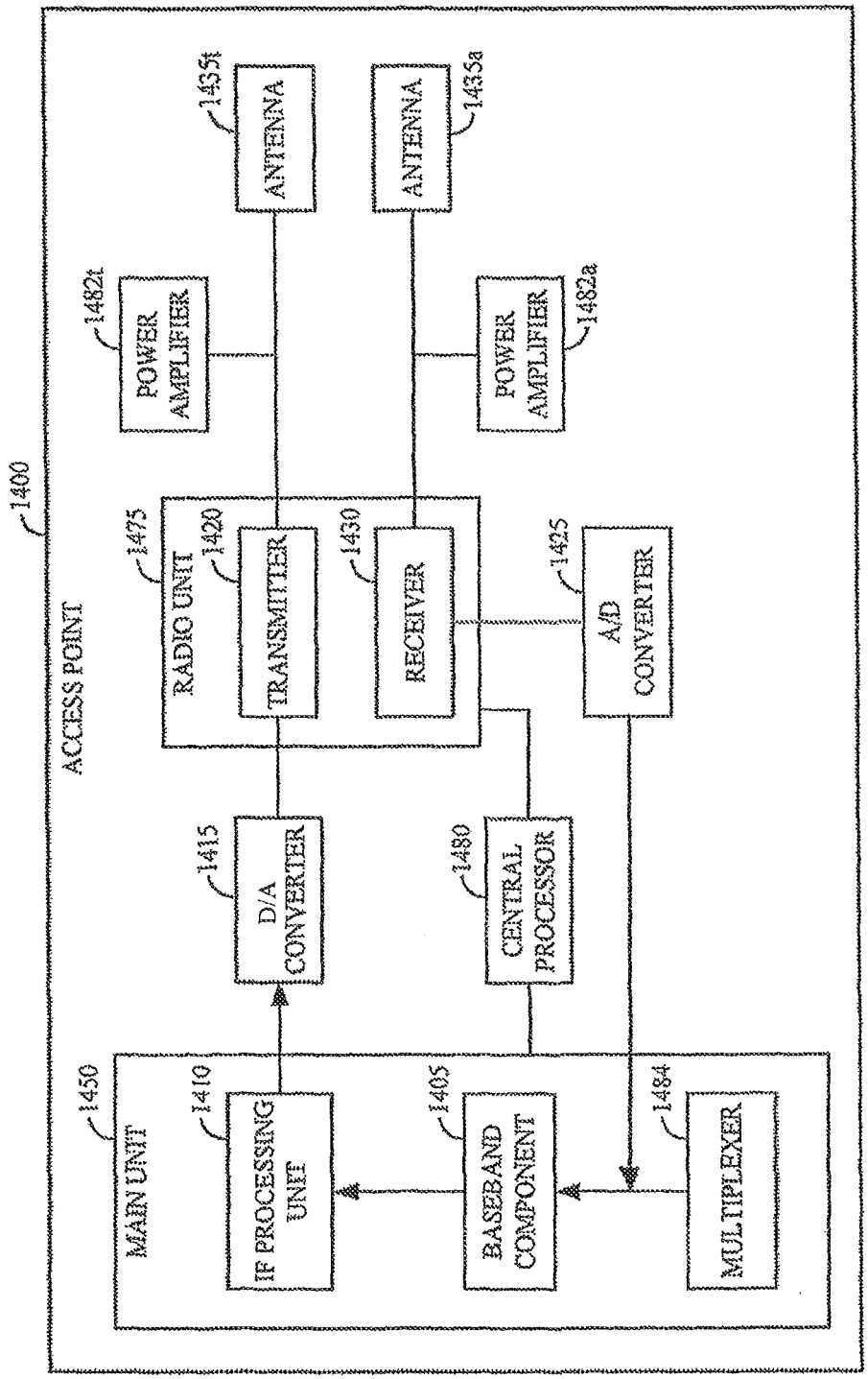
FIG. 9 illustrates aspects of an access point.

Referring to FIG. 9, an access point 1400 can comprise a main unit (MU) 1450 and a radio unit (RU) 1475. MU 1450 includes the digital baseband components of an access point 1400. For example, MU 1450 can include a baseband component 1405 and a digital intermediate frequency (IF) processing unit 1410. Digital IF processing unit 1410 digitally processes radio channel data at an intermediate frequency by performing such functions as filtering, channelizing, modulation, and so forth. RU 1475 includes the analog radio parts of the access point 1400. As used herein, a radio unit is the analog radio parts of an access point or other type of transceiver station with direct or indirect connection to a mobile switching center or corresponding device. A radio unit typically serves a particular sector in a communication system. For example, RU 1475 can include one or more receivers 1430 connected to one or more antennas 1435*a-t* for receiving radio communications from mobile subscriber units. In an aspect, one or more power amplifiers 1482*a-t* are coupled to one or more antennas 1435*a-t*. Connected to receiver 1430 is an analog-to-digital (A/D) converter 1425. A/D converter 1425 converts the analog radio communications received by receiver 1430 into digital input for transmission to baseband component 1405 via digital IF processing unit 1410. RU 1475 can also include one or more transmitters 1420 connected to either the same or different antenna 1435 for transmitting radio communications to access terminals. Connected to transmitter 1420 is a digital-to-analog (D/A) converter 1415. D/A converter 1415 converts the digital communications received from baseband component 1405 via digital IF processing unit 1410 into analog output for transmission to the mobile subscriber units. In some aspects, a multiplexer 1484 for multiplexing of multiple-channel signals and multiplexing of a variety of signals including a voice signal and a data signal. A central processor 1480 is coupled to main unit 1450 and RU 1475 for controlling various processing which includes the processing of voice or data signal.

FIG. 10 illustrates aspects of a methodology for determining a type of calibration to apply. Calibration weights are determined for approaches are performed using phase only mismatch information, block 1500, and using phase and amplitude mismatch information, block 1502. Phase only information may include only the phase of the calibration vectors, channel estimates, or the like to calculate the calibration weights. Phase and amplitude information may include the phase and amplitude information of the calibration vectors, channel estimates, or the like to calculate the calibration weights. The calibration weights may be calculated based upon information from multiple access terminals as described with respect to FIGS. 6 and 7. Alternatively, they may be from information for a single access terminal.

A selection is then made as to which set of weights to apply, block 1504. This determination may be made based upon whether the amplitude mismatch after utilizing calibration weights, which may be calculated at the access point, is now worse than without calibration. In some aspects, this may be based on the following Equation 13:

$$\sigma_{max}^2 = \max(\sigma_\alpha^2, \sigma_\beta^2) \text{ and } \sigma_{min}^2 = \min(\sigma_\alpha^2, \sigma_\beta^2) \qquad (13)$$

In Equation 13, $\sigma_\alpha$ represents the amplitude difference between the uncalibrated and calibrated weights for the transmit chain of the antenna of the access point and $\sigma_\beta$ represents the amplitude difference between the uncalibrated and calibrated weights for the receive chain of the antenna of the access point. Then a determination may be made whether these exceed some threshold for their relationship. For example, whether the minimum is greater than the maximum by some predetermined or system calculated factor, e.g. 3. In other cases, a determination of whether one, or both, of $\sigma_\alpha$ and $\sigma_\beta$ exceeds some predetermined threshold. In other cases, different measurements of the calibration mismatch, thresholds, or relationships may be utilized. The selected weights are then applied, block 1506.

For a multiple-access system (e.g., a frequency division multiple-access (FDMA) system, an orthogonal frequency division multiple-access (OFDMA) system, a code division multiple-access (CDMA) system, a time division multiple-access (TDMA) system, etc.), multiple terminals may transmit concurrently on the reverse link. For such a system, the pilot subcarriers may be shared among different terminals. The channel estimation techniques may be used in cases where the pilot subcarriers for each terminal span the entire operating band (possibly except for the band edges). Such a pilot subcarrier structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1390 and 1350.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of calibrating an antenna array, comprising:
   determining first calibration weights for the antenna array using phase only estimates based upon a first calibration technique;
   determining second calibration weights for the antenna array using phase and amplitude estimates based upon a second calibration technique; and
   determining whether to apply the first calibration weights from the first calibration technique or the second calibration weights from the second calibration technique to the antenna array based on (a) an output provided by utilizing the first calibration weights, (b) an output provided by utilizing the second calibration weights, or (c) both (a) and (b).

2. The method of claim 1, wherein the phase only estimates comprise channel estimate information.

3. The method of claim 1, wherein the phase only estimates comprise a component of a calibration vector including both phase and amplitude information.

4. The method of claim 1, wherein determining whether to apply the calibration weights comprises determining based upon a ratio of the output provided by utilizing the first calibration weights with respect to the output provided by utilizing the second calibration weights.

5. The method of claim 1, wherein determining whether to apply the calibration weights comprises determining a difference between an amplitude mismatch between an uncalibrated transmission and the output provided by utilizing the first calibration weights and the uncalibrated transmission and the output provided by utilizing the second calibration weights.

6. The method of claim 1, wherein determining whether to apply the calibration weights comprises determining a difference between a ratio of a difference between a minimum of an amplitude mismatch between an uncalibrated transmission and the output provided by utilizing the first calibration weights and the uncalibrated transmission and the output provided by utilizing the second calibration weights, and a maximum of an amplitude mismatch between the uncalibrated transmission and the output provided by utilizing the first calibration weights and the uncalibrated transmission and the output provided by utilizing the second calibration weights.

7. The method of claim 1, wherein determining based upon the first calibration technique and determining based upon the second calibration technique comprise determining based upon information only from a single access terminal.

8. The method of claim 1, wherein determining based upon the first calibration technique and determining based upon the second calibration technique comprise determining based upon information only from multiple access terminals.

9. The method of claim 1, wherein the first calibration weights correspond to a mismatch of a transmit chain gain and a receive chain gain based on the first calibration technique, and the second calibration weights correspond to a mismatch of the transmit chain gain and the receive chain gain based on the second calibration technique.

10. A wireless communication apparatus comprising:
    at least two antennas; and
    a processor coupled with the at least two antennas, the processor configured to:
        determine first calibration weights to apply for communication with the at least two antennas using phase only estimates based upon one of at least two calibration types;
        determine second calibration weights to apply for communication with the at least two antennas using phase and amplitude estimates based upon another of the at least two calibration types; and
        determine the calibration type to apply, for communication with the at least two antennas, from the at least two calibration types based on (a) an output provided by utilizing the first calibration weights, (b) an output provided by utilizing the second calibration weights, or (c) both (a) and (b), wherein the one of the at least two calibration types is different from the another of the at least two calibration types.

11. The wireless communication apparatus of claim 10, wherein the processor is configured to determine the calibration type based upon a ratio of the output provided by utilizing the first calibration weights with respect to the output provided by utilizing the second calibration weights.

12. The wireless communication apparatus of claim 10, wherein the processor is configured to determine the calibration type based upon a difference between an amplitude mismatch between uncalibrated transmission and the output provided by utilizing the first calibration weights and uncalibrated transmission and the output provided by utilizing the second calibration weights.

13. The wireless communication apparatus of claim 10, wherein the processor is configured to determine the calibration type based upon a difference between a ratio of a difference between a minimum of an amplitude mismatch between uncalibrated transmission and the output provided by utilizing the first calibration weights and uncalibrated transmission and the output provided by utilizing the second calibration weights, and a maximum of an amplitude mismatch between uncalibrated transmission and the output provided by utilizing the first calibration weights and uncalibrated transmission and the output provided by utilizing the second calibration weights.

14. The wireless communication apparatus of claim 10, wherein the processor is configured to determine the calibration type based upon information only from a single access terminal.

15. The wireless communication apparatus of claim 10, wherein the processor is configured to determine the calibration type based upon information only from multiple access terminals.

16. An apparatus for calibrating an antenna array, comprising:
    means for determining first calibration weights for the antenna array using phase only estimates based upon a first calibration technique;
    means for determining second calibration weights for the antenna array using phase and amplitude estimates based upon a second calibration technique; and
    means for determining whether to apply the calibration weights from the first calibration technique or the second calibration technique to the antenna array based on (a) an output provided by utilizing the first calibration weights, (b) an output provided by utilizing the second calibration weights, or (c) both (a) and (b).

17. The apparatus of claim 16, wherein the means for determining whether to apply the calibration weights comprises means for determining based upon a ratio of the output provided by utilizing the first calibration weights with respect to the output provided by utilizing the second calibration weights.

18. The apparatus of claim 16, wherein the means for determining whether to apply the calibration weights comprises means for determining a difference between an amplitude mismatch between uncalibrated transmission and the output provided by utilizing the first calibration technique and uncalibrated transmission and the output provided by utilizing the second calibration technique.

19. The apparatus of claim 16, wherein the means for determining whether to apply the calibration weights comprises means for determining a difference between a ratio of a difference between a minimum of an amplitude mismatch between uncalibrated transmission and the output provided by utilizing the first calibration weights and uncalibrated transmission and the output provided by utilizing the second calibration weights, and a maximum of an amplitude mismatch between uncalibrated transmission and the output provided by utilizing the first calibration weights and uncalibrated transmission and the output provided by utilizing the second calibration weights.

20. A non-transitory processor readable medium storing processor readable instructions for causing a processor to:
determine first calibration weights for an antenna array using phase only estimates based upon a first calibration technique;
determine second calibration weights for the antenna array using phase and amplitude estimates based upon a second calibration technique; and
determine whether to apply the calibration weights from the first calibration technique or the second calibration technique to the antenna array based on (a) an output provided by utilizing the first calibration weights, (b) an output provided by utilizing the second calibration weights, or (c) both (a) and (b).

* * * * *